P. S. MEDART.
VAULTING STANDARD.
APPLICATION FILED MAY 19, 1914.
1,128,705.
Patented Feb. 16, 1915.
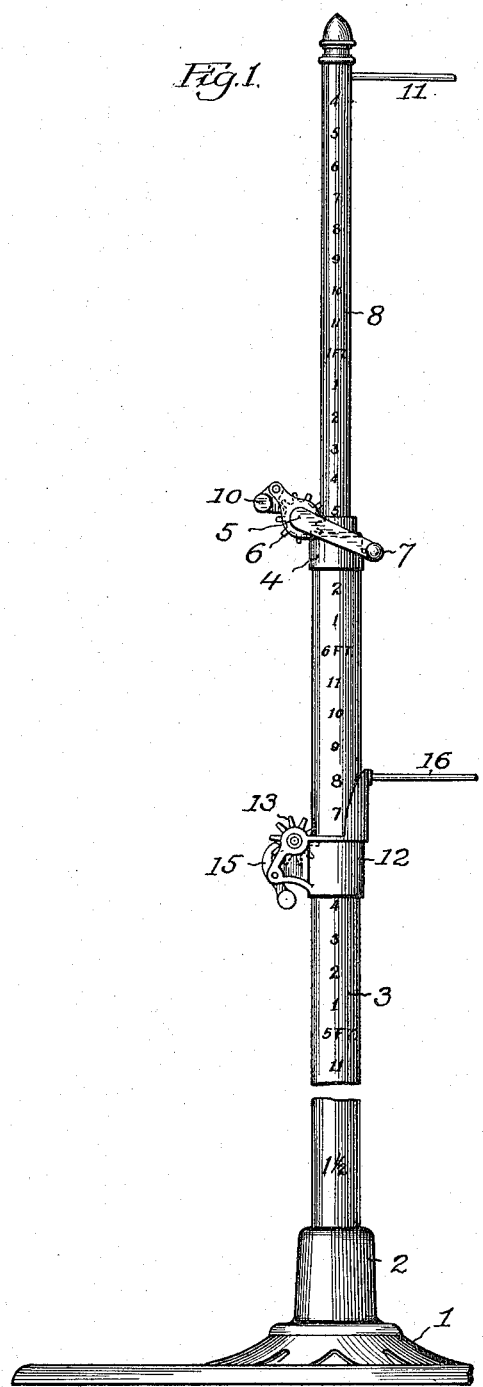
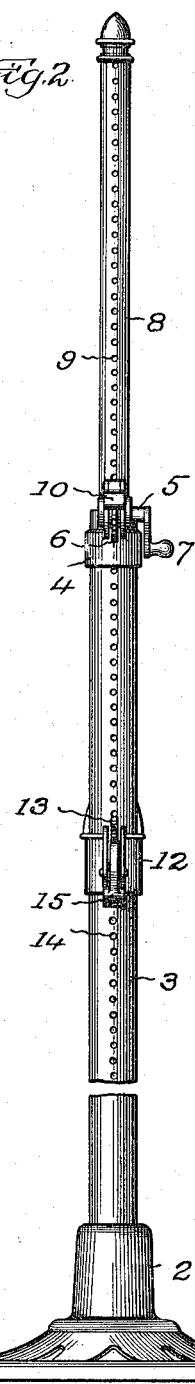

UNITED STATES PATENT OFFICE.

PHILIP S. MEDART, OF ST. LOUIS, MISSOURI, ASSIGNOR TO FRED MEDART MANUFACTURING COMPANY, OF ST. LOUIS, MISSOURI, A CORPORATION OF MISSOURI.

VAULTING-STANDARD.

1,128,705. Specification of Letters Patent. Patented Feb. 16, 1915.

Application filed May 19, 1914. Serial No. 839,533.

*To all whom it may concern:*

Be it known that I, PHILIP S. MEDART, a citizen of the United States of America, and a resident of St. Louis, in the State of Missouri, have invented certain new and useful Improvements in Vaulting-Standards, of which the following is a specification.

This invention relates to the adjustable type of vaulting standards used in athletic exercises, and has for its object to provide a simple and efficient construction and combination of parts whereby the members of the standard can be adjusted vertically in a convenient and rapid manner, and automatically and securely locked at the required adjustment, all as will hereinafter more fully appear.

In the accompanying drawings:—Figure 1, is a front elevation of a vaulting standard having the present invention applied. Fig. 2, is a side elevation of the same.

Similar reference numerals indicate like parts in both views.

Referring to the drawings, 1 represents the supporting base, preferably of the dish shape shown, and having a centrally disposed vertical socket member or hub 2 for the attachment of the main tubular member or column of the appliance.

3 designates the lower tubular member or columns above referred to preferably of a round form in cross-section, and fixedly secured in the socket member or hub 2, aforesaid.

4 designates a bracket member secured to the upper end of the tubular member or column 3, aforesaid, and having journal bearing for a crank shaft 5 carrying a sprocket pinion 6, and an operating hand crank 7.

8 designates the upper vertical member or post of the appliance, preferably of a circular form in cross-section, and adapted to have vertical adjustment in the bore of the lower member or column 3, aforesaid. In one side of said member or post 8, a vertical series of sprocket orifices 9, are formed, and said orifices are adapted for operative engagement with the aforesaid sprocket pinion 6, so that the member or post 8 will receive positive vertical adjustment therefrom.

10 designates a gravity dog or pawl pivoted on the bracket member 4, adapted to engage with the teeth of the sprocket pinion 6, to maintain the upper member or post 8 of the appliance at the required vertical adjustment.

11 designates a horizontal bracket pin or other like extension, attached to the upper end of the member or post 8, and adapted to provide a gage, or be the means for supporting an ordinary horizontal bar to act as a gage, in pole vaulting, high kicking and like exercises.

12 designates a sleeve slidingly mounted on the lower tubular member or column 3, and provided with lateral bracket ears in which are journaled the shaft of a sprocket pinion 13 which has operative engagement with a vertical series of sprocket orifices 14 in the member or columns 3 aforesaid.

15 designates a gravity pawl pivoted in the aforesaid bracket ears of the sleeve 12 and adapted to engage the teeth of the aforesaid sprocket pinion 13, to maintain the sleeve 12 at the required vertical adjustment.

16 designates a horizontal pin or like extension carried by the sleeve 12 to act as a gage in jumping and like exercises.

Suitable scales are applied to the respective members 3 and 8 to indicate the heights at which the respective gage pins 11 and 16, are placed.

Having thus fully described my said invention what I claim as new and desire to secure by Letters Patent, is:—

In a vaulting standard, the combination of upper and lower vertical members slidingly connected together, a bracket member carried on the upper end of the lower member, a shaft journaled in said bracket and carrying a sprocket pinion and an operating crank, the upper member being formed with a vertical series of sprocket orifices for operative engagement with the aforesaid sprocket pinion, and a gravity pawl carried by said bracket and adapted for locking engagement with the aforesaid sprocket pinion, a sleeve slidingly mounted on the aforesaid lower member and provided with lateral brackets, a sprocket pinion journaled in said brackets, said lower member being formed with a vertical series of sprocket orifices for operative engagement with said sprocket pinion, and a gravity pawl carried by said sleeve and adapted for locking engagement with said sprocket pinion, substantially as set forth.

Signed at St. Louis, Missouri, this 15th day of May, 1914.

PHILIP S. MEDART.

Witnesses:
M. C. MILLER,
F. J. HARTMANN.

Copies of this patent may be obtained for five cents each, by addressing the "Commissioner of Patents, Washington, D. C."